(12) United States Patent
Ohtake et al.

(10) Patent No.: US 6,825,903 B2
(45) Date of Patent: Nov. 30, 2004

(54) LIQUID CRYSTAL DISPLAY ELEMENT AND METHOD OF MANUFACTURING THE SAME

(75) Inventors: Toshiya Ohtake, Fukaya (JP); Yuzo Hisatake, Yokohama (JP); Atsuko Oono, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 148 days.

(21) Appl. No.: 09/840,126

(22) Filed: Apr. 24, 2001

(65) Prior Publication Data

US 2002/0021392 A1 Feb. 21, 2002

(30) Foreign Application Priority Data

Apr. 24, 2000 (JP) ........................................ 2000-122928

(51) Int. Cl.⁷ .......................................... G02F 1/1335
(52) U.S. Cl. ........................................ 349/115; 349/96
(58) Field of Search .............................. 349/156, 120, 349/115, 117, 176, 172

(56) References Cited

U.S. PATENT DOCUMENTS

| | | | | |
|---|---|---|---|---|
| 5,061,045 A | * | 10/1991 | Yoneya et al. | 349/172 |
| 5,444,533 A | * | 8/1995 | Nishiura et al. | 356/460 |
| 5,570,215 A | * | 10/1996 | Omae et al. | 349/117 |
| 5,843,333 A | * | 12/1998 | Hakemi | 252/299.5 |
| 5,855,971 A | * | 1/1999 | Kobori et al. | 428/1.2 |
| 5,990,997 A | | 11/1999 | Jones et al. | |
| 6,102,545 A | * | 8/2000 | Ogino | 353/38 |
| 6,141,071 A | * | 10/2000 | Sharp | 349/121 |
| 6,156,232 A | * | 12/2000 | Shashidhar et al. | 252/299.4 |
| 6,201,592 B1 | * | 3/2001 | Terashita et al. | 349/156 |
| 6,295,108 B1 | | 9/2001 | Kaneko | |
| 6,411,355 B1 | * | 6/2002 | Manabe et al. | 349/120 |
| 6,424,395 B1 | * | 7/2002 | Sato et al. | 349/112 |
| 6,433,853 B1 | * | 8/2002 | Kameyama et al. | 349/176 |
| 6,519,017 B1 | * | 2/2003 | Ichihashi et al. | 349/117 |

FOREIGN PATENT DOCUMENTS

| | | |
|---|---|---|
| EP | 0 860 717 A2 | 8/1998 |
| EP | 0 881 509 A2 | 12/1998 |
| JP | 11-84371 | 3/1999 |

* cited by examiner

Primary Examiner—John F. Niebling
Assistant Examiner—Olivia T. Luk
(74) Attorney, Agent, or Firm—Pillsbury Winthrop LLP

(57) ABSTRACT

A liquid crystal display element comprises a polarization plates, phase difference plates, a liquid crystal layer, and selectively reflective layers for reflecting part or whole of circularly polarized light in a specific direction. The products of the respective thicknesses of the polarization plate, phase difference plate, liquid crystal layer, and selectively reflective layer and the difference between an average refractive index in a direction perpendicular to each display plane and an average refractive index in a direction parallel to the display plane are set so that the absolute value of their sum total is 50 nm or less. Each selectively reflective layer is formed of a layer having positive refractive index anisotropy and a layer having negative refractive index anisotropy.

6 Claims, 3 Drawing Sheets

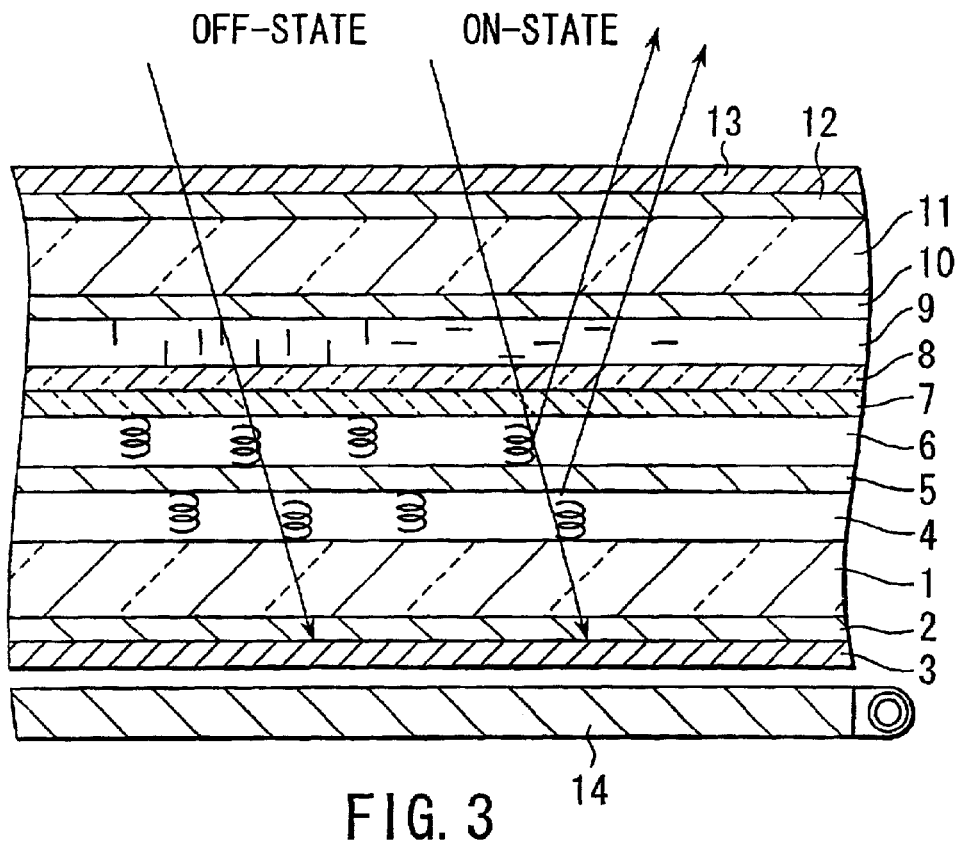
FIG. 3
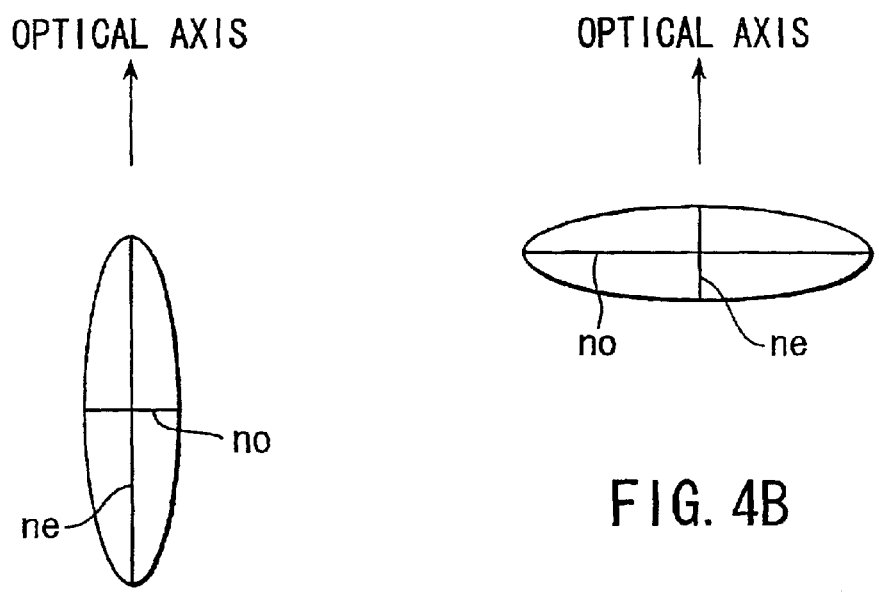
FIG. 4A
FIG. 4B

LIQUID CRYSTAL DISPLAY ELEMENT AND
METHOD OF MANUFACTURING THE SAME

CROSS-REFERENCE TO RELATED APPLICATIONS

This application is based upon and claims the benefit of priority from the prior Japanese Patent Application No. 2000-122928, filed Apr. 24, 2000, the entire contents of which are incorporated herein by reference.

BACKGROUND OF THE INVENTION

The present invention relates to a liquid crystal display element, and more particularly, to a reflective liquid crystal display element and a half-transmissive liquid crystal display element, and a method of manufacturing the same.

These days, liquid crystal display elements are applied to various fields including note-type personal computers, display monitors, car navigation systems, desk-top function calculators, medium- and small-sized TV sets, etc. Among these display elements, reflective liquid crystal display elements do not require use of a backlight, so that they can enjoy low power consumption, thinness, and lightness in weight. To make the most of these advantages, the display elements of this type are expected to be applied to displays for portable apparatuses such as mobile personal computers.

However, a conventional reflective liquid crystal display element, like paper, is designed to utilize external light for display. If it is worked in a dark place, therefore, its display screen is too dark to be viewed with ease. It cannot be used at all in total darkness, in particular.

For this reason, the efficiency of light utilization of reflective liquid crystal display elements to be developed in the future should be as high as possible. The light utilization can be improved by optimizing a polarization plate, phase difference plate, color filter, etc., adopting a guest-host mode in which neither a polarization plate nor a phase difference plate is used, or developing reflective layers with high reflection efficiency.

A method is proposed in which a cholesteric liquid crystal is used for a high-reflection reflective layer. The cholesteric reflective layer serves to reflect circularly polarized light beams in a specific direction, out of light beams incident upon it. The wavelength zone of the reflected light various depending on the helical pitch of the cholesteric liquid crystal. Accordingly, only light beams in a desired wavelength zone can be reflected if a plurality of cholesteric liquid crystal layers with different pitches are laminated to one another. If six or more layers are laminated, in particular, most of light beams in the visible light zone can be reflected. These cholesteric reflective layers, compared with conventional metallic reflective layers of aluminum or the like, absorb less light, so that their light utilization is highly efficient.

On the other hand, a half-transmissive liquid crystal display element has been developed to solve the problem of the conventional reflective liquid crystal display element that cannot be used at all in total darkness. This half-transmissive element is provided with a backlight and a half-mirror for use as a half-transmissive reflective layer such that the element can be used as a transmissive liquid crystal display element in a dark place. Further, a half-transmissive liquid crystal display element is studied such that a pinhole is formed in the reflective layer for each pixel and a micro-lens is provided for each pixel. In the case where this liquid crystal display element is used as a reflective type, compared with the conventional reflective liquid crystal display element, the brightness of its display screen is lowered only by a margin corresponding to the pinhole. In the case where the display element is used as a transmissive type, a display screen as bright as that of the transmissive liquid crystal display element can be obtained if light emitted from a backlight is converged by means of a micro-lens and transmitted through the pinhole.

If the aforesaid cholesteric reflective layer is used as the reflective layer of the half-transmissive liquid crystal display element described above, moreover, the display element can enjoy high efficiency of light utilization and can be highly visible in both light and dark places.

In a liquid crystal display element, in general, however, the polarization plate, phase difference plate, liquid crystal layer, reflective layer, etc. are formed by laminating layers that have different positive or negative refractive index anisotropies. It is believed, therefore, that the luminance and chromaticity of the display element vary depending on the visual axis, frontal or oblique, and that the viewing angle of the display element is narrow.

This is a problem essential to the reflective and half-transmissive liquid crystal display elements that are expected to utilize external light and light from the backlight with high efficiency in the aforesaid manner. In the case where the cholesteric reflective layer, which generally has unique refractive index anisotropy, is used, in particular, it is believed to exhibit a unique viewing angle characteristic.

BRIEF SUMMARY OF THE INVENTION

The present invention has been contrived in consideration of these circumstances, and its object is to provide a liquid crystal display element, capable of enjoying a display characteristic that hardly varies depending on the visual axis, frontal or oblique, and a manufacturing method therefor.

In order to achieve the above object, a liquid crystal display element according to the present invention comprises a polarization plate having a fist average refractive index for a direction perpendicular to a display plane and a second average refractive index in a direction parallel to the display plane; a phase difference plate having a first average refractive index for a direction perpendicular to the display plane and a second average refractive index for a direction parallel to the display plane; a liquid crystal layer having a first average refractive index for a direction perpendicular to the display plane and a second average refractive index for a direction parallel to the display plane; and a selectively reflective layer for reflecting part or whole of circularly polarized light in a specific direction, the selectively reflective layer having a first average refractive index for a direction perpendicular to the display plane and a second average refractive index for a direction parallel to the display plane. The polarization plate, phase difference plate, liquid crystal layer, and selectively reflective layer are formed so that the absolute value of the sum total of the product of the thickness and the difference between the first and second average refractive indexes of the polarization plate, the product of the thickness and the difference between the first and second average refractive indexes of the phase difference plate, the product of the thickness and the difference between the first and second average refractive indexes of the liquid crystal layer, and the product of the thickness and the difference between the first and second average refractive indexes of the selectively reflective layer is 50 nm or less.

According to the liquid crystal display element of the invention, the selectively reflective layer is formed of one or a plurality of layers of a cholesteric liquid crystal, and one or more layers having positive refractive index anisotropy are arranged adjacent to the reflective layer or with one or more organic layers being interposed therebetween.

According to the liquid crystal display element described above, at least one of the layers having positive refractive index anisotropy is formed of a discotic liquid crystal.

According to the liquid crystal display element described above, moreover, at least one of the layers having positive refractive index anisotropy includes a reflective layer for reflecting specifically polarized light, light in a specific wavelength zone, or specifically polarized light in a specific wavelength zone only, out of incident light.

Another liquid crystal display element according to the invention comprises one or more reflective layers capable of reflecting specifically polarized light, light in a specific wavelength zone, or specifically polarized light in a specific wavelength zone only, out of incident light, the one or more reflective layers having positive refractive index anisotropy as a whole.

A method of manufacturing a liquid crystal display element according to the invention comprises vertically aligning a discotic liquid crystal doped with a chiral agent on a transparent first insulating substrate, thereby forming one or more reflective layers having positive refractive index anisotropy; opposing a transparent second insulating substrate to the first insulating substrate; and sealing in the a liquid crystal layer between the first and second insulating substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view for illustrating the principle of display for the case where the half-transmissive liquid crystal display element is used for reflective display;

FIGS. 4A and 4B are diagrams for illustrating refractive index anisotropy;

DETAILED DESCRIPTION OF THE INVENTION

A half-transmissive liquid crystal display element according to an embodiment of the present invention will now be described in detail with reference to the accompanying drawings.

Figure 1:
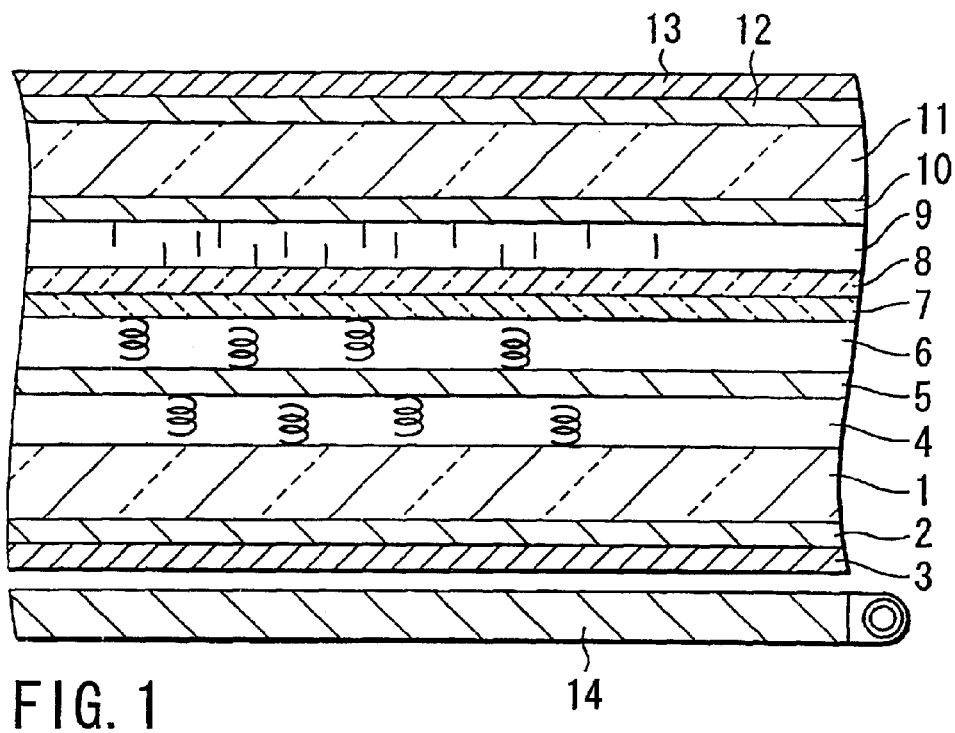
FIG. 1 is a sectional view of a half-transmissive liquid crystal display element according to an embodiment of the present invention.

As shown in FIG. 1, the liquid crystal display element comprises a lower substrate 1 and an upper substrate 11 that are opposed to each other. These substrates are formed of a transparent insulating substrate of, e.g., glass each. A phase difference plate 2 and a polarization plate 3 are arranged successively on the outer surface of the lower substrate 1. A first selectively reflective layer 4 having negative refractive index anisotropy, overcoat layer 5, second selectively reflective layer 6 having positive refractive index anisotropy, light diffusing layer 7, and transparent electrode 8 are formed successively in layers over the inner surface of the lower substrate 1.

A phase difference plate 12 and a polarization plate 13 are arranged successively over the outer surface of the upper substrate 11, and a liquid crystal driver circuit 10 including a color filter and a pixel electrode is provided on the inner surface of the substrate 11. A liquid crystal layer 9 is sealed in between the lower and upper substrates 1 and 11. Further, a backlight unit 14 is opposed to the outer surface of the lower substrate 1.

The following is a detailed description of a configuration of the half-transmissive liquid crystal display element along with a manufacturing method therefor.

First, the first selectively reflective layer 4 is formed on the lower substrate 1. The layer 4, which has negative refractive index anisotropy, serves to reflect some, e.g., 70%, of circularly polarized light (right-handed circularly polarized light in this case) components of incident light in a specific direction and to transmit 30%, the remainder.

The first selectively reflective layer 4 may be formed of any material that has the aforesaid functions. According to the present embodiment, however, the layer 4 is a continuum formed of a cholesteric liquid crystal polymer layer capable of reflecting light in the ultraviolet zone and having helical pitches and a cholesteric liquid crystal polymer layer capable of reflecting light with wavelength of 600 nm and having helical pitches.

According to this arrangement, it is provided the first selectively reflective layer 4 wherein the helical pitches continuously change within the layer, owing to an interface interaction effect, and which can utilize light, in a wide range from the ultraviolet zone to the wavelength of 600 nm, for display. The cholesteric liquid crystal polymer layer is formed by one or more cycles of operations including spin-coating, UV cross-linking, and thermal polymerization.

In forming the first selectively reflective layer 4, an alignment layer of polyimide or the like may be provided between the lower substrate 1 and the layer 4. The alignment layer serves steadily to orientate the cholesteric liquid crystal polymer layer and can fulfill its selective reflection function without a loss.

Then, the second selectively reflective layer 6 is formed over the first selectively reflective layer 4 with the overcoat layer 5 between them. The overcoat layer 5, which serves to separate the first and second selectively reflective layers 4 and 6, need not always be formed unless the function of the first layer 4 is ruined when the second layer 6 is formed on the first layer 4.

The second selectively reflective layer 6, like the first selectively reflective layer 4, serves to reflect some, e.g., 70%, of circularly polarized light (right-handed circularly polarized light in this case) components of incident light in a specific direction and to transmit 30%, the remainder. However, it is formed of a material with positive refractive index anisotropy.

The second selectively reflective layer 6 may be formed of any material that has the aforesaid functions. In this case, however, the layer 6 is a continuum formed of a discotic liquid crystal polymer layer that is twisted at pitches such that light with wavelength of 600 nm is reflected and a discotic liquid crystal polymer layer that is twisted at pitches such that infrared light is reflected. According to this arrangement, it is provided the second selectively reflective layer 6 wherein the helical pitches continuously change within the layer, owing to an interface interaction effect, and that can utilize light, in a wide range from the wavelength of 600 nm to the infrared zone, for display.

Although the reflection wavelength zones for the first and second selectively reflective layers 4 and 6 are set in the aforesaid manner according to the present embodiment, the present invention is not limited to this embodiment. For example, the wavelength zones for selective reflection, compared with those for the present embodiment, may be reversed with respect to the first and second selectively reflective layers 4 and 6 or arranged overlapping each other. Alternatively, moreover, there may be wavelength zones where light is reflected by neither of the first and second layers 4 and 6 at all.

Further, one of the first and second selectively reflective layers 4 and 6 need not be a selectively reflective layer and may simply be a layer that has negative or positive refractive index anisotropy. Furthermore, the first and second layers 4 and 6 may be counter changed in position. In either case, it is necessary only that layers that can reflect light of necessary wavelength zones according to the purpose of use of the liquid crystal display element and have negative and positive refractive index anisotropies be laminated to each other with the aid of an overcoat layer, if necessary.

Then, the light diffusing layer 7 is formed on the second selectively reflective layer 6. The diffusing layer 7 is formed by spin-coating and baking a dispersion of a transparent substance, such as titanium oxide, with particle diameters of, e.g., 0.01 to 5 $\mu$m, in a transparent organic material such as polyimide. A light diffusing layer with suitable light scattering properties can be obtained by adjusting the refractive indexes, shapes, and materials of the transparent substance and the transparent organic material or the particle diameters and mixture ratio of the transparent substance.

The light diffusing layer 7 may be formed on the side of the upper substrate 11, not on top of the second selectively reflective layer 6. Alternatively, a layer formed on a plastic film such as TAC may be pasted on the outer surface of the upper substrate 11.

Then, the transparent electrode 8 is formed on the light diffusing layer 7. Sputtering or spin-coating may be used as a method for forming the transparent electrode 8. If necessary, overcoat layers may be formed between the second selectively reflective layer 6, light diffusing layer 7, and transparent electrode 8.

A cell is assembled from the lower glass substrate 1 formed in this manner and the upper glass substrate 11, having the liquid crystal driver circuit 10 formed thereon by the conventional TFT (thin film transistor) process, and a liquid crystal is injected into the space between the glass substrates. In this case, an n-type nematic liquid crystal having negative refractive index anisotropy is used for the liquid crystal layer 9, and an alignment film is applied and rubbed to subject the liquid crystal molecules to vertical alignment before the cell is assembled.

According to the present embodiment, the aforesaid VA (vertical alignment) mode is adopted as the liquid crystal mode. Alternatively, however, a p-type nematic liquid crystal may be used, or the VA mode may be replaced with a homogeneous mode, HAN (hybrid alignment nematic) mode, IPS (in-plane switching) mode, or any other suitable liquid crystal mode.

After the liquid crystal is injected and subjected to a suitable heat treatment, the phase difference plates 2 and 12 and the polarization plates 3 and 13 are pasted on the respective outer surfaces of the lower and upper substrates 1 and 11, individually, and a peripheral circuit (not shown) for applying signals to the liquid crystal driver circuit 10 and the backlight unit 14 are mounted in place, whereupon the half-transmissive liquid crystal display element is completed.

Although the liquid crystal driver circuit 10 that includes TFTs and the like is formed on the upper substrate 11 according to the present embodiment, it may alternatively be incorporated in the lower substrate 1. In this case, the driver circuit 10 may be located under or between the first and second selectively reflective layers 4 and 6 so that the first and second layers 4 and 6 can be patterned partially or wholly to the pixel size. Further, the driver circuit 10 may be formed above the second selectively reflective layer 6.

According to the present embodiment, moreover, the liquid crystal driver circuit 10 has a COA (color-filter-on array) structure including a color filter. Alternatively, however, the color filter may be provided separately from switching elements such as the pixel electrode, TFT, etc. In this case, the color filter may be located in any position in an optical path for light that is conducive to display.

The following is a description of the principle of display of the half-transmissive liquid crystal display element constructed in this manner. The principle of display for the case where the element is used as a transmissive liquid crystal display element will be described first.

Figure 2:
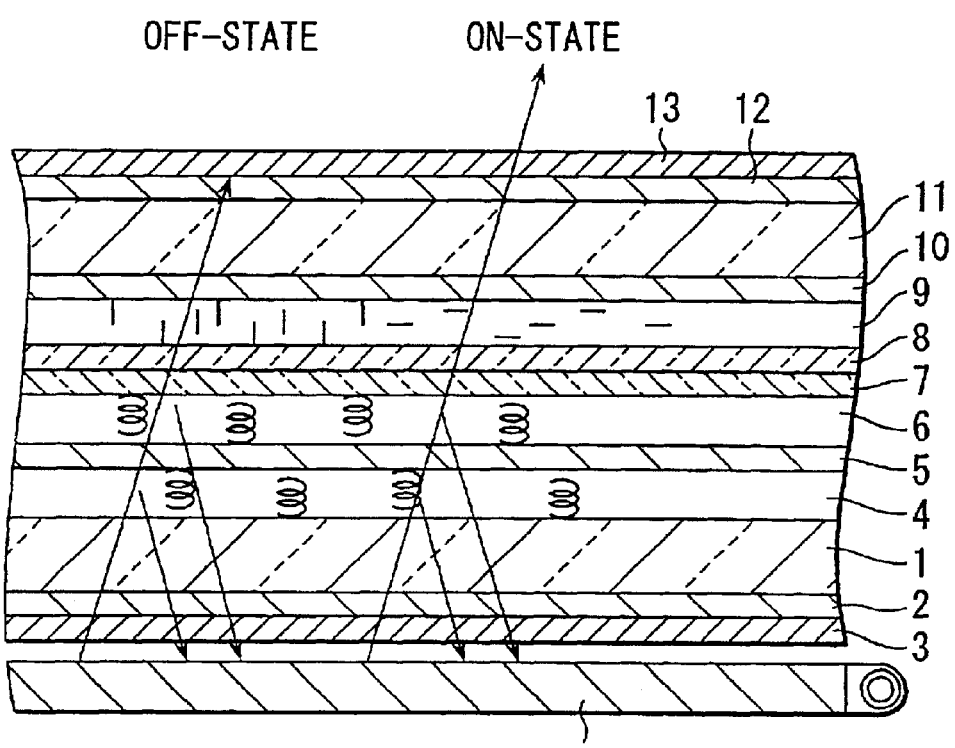
FIG. 2 is a view for illustrating the principle of display for the case where the half-transmissive liquid crystal display element is used for transmissive display.

As shown in FIG. 2, light emitted from the backlight unit 14 passes through the polarization plate 3 and the phase difference plate 2. In this case, the plates 3 and 2 are located so that the axis of absorption of the polarization plate 3 is inclined at an angle of 45° to the optical axis of the phase difference plate 2, and the retardation of the phase difference plate 2 is adjusted to $\lambda/4$. In this arrangement, the light transmitted through the plates 3 and 2 turns into circularly polarized light (right-handed circularly polarized light in this case) in a specific direction. 70% of the right-handed circularly polarized light is reflected by the first and second selectively reflective layers 4 and 6, and 30% is transmitted. The reflected and transmitted circularly polarized light components remain right-handed. The reflected light is reversely transmitted through the phase difference plate 2 and the polarization plate 3, reflected by the backlight unit 14, and guided again into the liquid crystal display element. As these processes are repeated, about 50% of the light emitted from the backlight unit 14 is finally transmitted through the first and second selectively reflective layers 4 and 6.

If the aforesaid light is incident upon a pixel in which no voltage is applied to the liquid crystal layer 9 (off-state), the layer 9, which is located extending at right angles to the substrates 1 and 11, transmits the light as it is. The light is absorbed by the polarization plate 13 to establish black display, since the phase difference plate 12 and the polarization plate 13 are reversely arranged so that the angle between them is equal to the angle between the axis of absorption of the polarization plate 3 and the optical axis of the phase difference plate 2.

If the aforesaid light is incident upon a pixel in which voltage is applied to the liquid crystal layer 9 (on-state), on the other hand, the liquid crystal falls down to cause retardation corresponding to the voltage, and the state of polarization of the incident light is changed. Accordingly, the light is emitted to the outside of the liquid crystal display element without being entirely absorbed by the polarization plate 13. When the retardation comes to just λ/2, the incident right-handed circularly polarized light turns into left-handed circularly polarized light, and is emitted to the outside of the liquid crystal display element without being absorbed by the polarization plate 13. The emitted light is colored corresponding to the color of the color filter through which it is transmitted, and is recognized by a user.

The following is a description of the principle of display for a reflective liquid crystal display element. As shown in FIG. 3, incident light from the outside of the liquid crystal display element passes through the polarization plate 13 and the phase difference plate 12, thereby turning into left-handed circularly polarized light. The light incident upon the pixel in which no voltage is applied to the liquid crystal layer 9 is landed entire on the second and first selectively reflective layers 6 and 4 without undergoing phase modulation. In the second and first selectively reflective layers 6 and 4, the left-handed circularly polarized light is transmitted without being reflected and is absorbed by the polarization plate 3, so that black display is established.

On the other hand, the state of polarization of the light incident upon the pixel in which voltage is applied to the liquid crystal layer 9 is charged by retardation corresponding to the magnitude of the voltage. 70% of the right-handed circularly polarized light components of the incident light are reflected by the second and first selectively reflective layers 6 and 4, and turn again into left-handed circularly polarized light in the liquid crystal layer 9. The resulting light is emitted to the outside of the liquid crystal display element through the polarization plate 13. When the retardation comes to just λ/2, the incident left-handed circularly polarized light passes through the liquid crystal layer 9, thereby turning entirely into right-handed circularly polarized light. The second and first selectively reflective layers 6 reflect 70% of the right-handed circularly polarized light, so that bright display is established.

The following is a description of the viewing angle of the half-transmissive liquid crystal display element according to the present embodiment. If there is a relation, Δn=ne−no>0, where no and ne are refractive indexes that are perpendicular to and parallel to the optical axis, respectively, the display element is considered to have positive refractive index anisotropy, in general. If there is a relation, Δn=ne−no<0, in contrast with this, the display element is considered to have negative refractive index anisotropy. FIGS. 4A and 4B are conceptual diagrams showing the cases where the refractive index anisotropy is positive and negative, respectively.

Now let it be supposed, for each of the layers that constitute the liquid crystal display element, that the optical axis extends in a direction perpendicular to the glass substrate, the average refractive index for the direction perpendicular to the glass substrate is ne, and the average refractive index for the direction parallel to the glass substrate is no. In this case, a layer with Δn=ne−no>0 is defined as a layer that as a positive refractive index, and a layer with Δn=ne−no<0 as a layer that has a negative refractive index.

According to the present embodiment, the first selectively reflective layer 4 is formed of a cholesteric liquid crystal. If refractive indexes for directions perpendicular and parallel to the major axis of the liquid crystal molecules are nchV and nchP (nchV<nchP), respectively, ne and no are given by $$ne = nchV,$$

$$no = ((nchV2 + nchP2)/2) \, 0.5,$$

so that the refractive index anisotropy Δnch of the first selectively reflective layer 4 is given by $$\Delta nch = ne - no = nchV - ((nchV2 + nchP2)/2)0.5 < 0,$$

which indicates negative refractive index anisotropy.

Further, the second selectively reflective layer 6 has a structure in which a discotic liquid crystal is twisted when it is vertically aligned. If refractive indexes for directions perpendicular and parallel to the optical axis of the liquid crystal molecules are ndcv and ndcP (ndcv>ndcP), respectively, ne and no are given by $$ne = ((nchV2 + nchP2)/2)0.5,$$

$$no = ndcV,$$

so that the refractive index anisotropy Δndc of the second selectively reflective layer 6 is given by $$\Delta ndc = ne - no = ((ndcV2 + ndcP2)/2) \, 0.5 - ndcv > 0,$$

which indicates positive refractive index anisotropy.

When no voltage is applied, on the other hand, the liquid crystal molecules of the liquid crystal layer 9 are vertically aligned. If refractive indexes for directions perpendicular and parallel to the major axis of the liquid crystal molecules are nlcV and nlcP (nlcV<nlcP), respectively, ne and no are given by $$ne = nlcP,$$

$$no = nlcV,$$

so that the refractive index anisotropy Δnlc of the liquid crystal layer 9 is given by $$\Delta nlc = ne - no = nlcP - nlcV > 0.$$

It can be supposed, moreover, that the phase difference plates 2 and 12 and the polarization plates 3 and 13 also have negative refractive index anisotropies (Δnph and Δnpol) when synthesized. The viewing angle of the half-transmissive liquid crystal display element according to the present embodiment must be regulated in consideration of all the aforesaid refractive index anisotropies. The sum total of the products of the respective refractive index anisotropies and thicknesses of the individual layers is defined as Rlcd given by $$Rlcd = \Delta nch \cdot dch + \Delta ndc \cdot ddc + \Delta nlc \cdot dlc + \Delta nph \cdot dph + \Delta npol \cdot dpol,$$

where dch, ddc, dlc, dph, and dpol are the thicknesses of the first selectively reflective layer 4, second selectively reflective layer 6, phase difference plates 2 and 12, and polarization plates 3 and 13, respectively.

Even if the individual layers have the aforesaid refractive index anisotropies, no phase difference is caused for light of which the optical path extends at right angles to the liquid crystal display element. Thus, in the case where the user observes the display element in a direction perpendicular to it, he/she can watch display that is based on the aforesaid principle of display without regard to the value of Rlcd.

Figure 5:
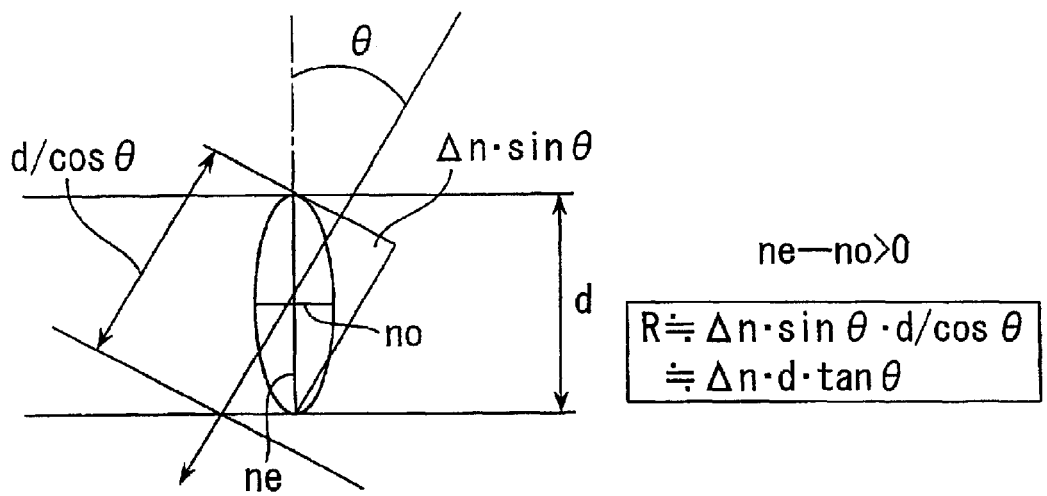
FIG. 5 is a diagram for illustrating the viewing angle and retardation of layers having positive refractive index anisotropy.

In the case where the user observes the liquid crystal display element in a direction inclined at θ from the direction perpendicular to the display element, the refractive index anisotropy and the layer thickness can be roughly approximated to Δn×sin θ and d/cos θ, respectively. Thus, the retardation is Δn·d·tan θ. FIG. 5 shows a phase difference as viewed diagonally when Δn is positive. If it is supposed that there are hardly any differences in angle of incidence that are attributable to differences in refractive index between the individual layers, the retardation of the whole liquid crystal display element is Rlcd·tan θ. In some cases, this retardation causes a phase difference, so that the display of the liquid crystal display element may be different from the display for the case where the display element is viewed at right angles to it. In order to minimize the change of the display that is attributable to the change of the viewing angle and obtain conspicuous display, the value of Rlcd should preferably be minimized.

Since the refractive index changes depending on the wavelength, in general, the value of the refractive index anisotropy also changes according to the wavelength. Thus, the value of Rlcd also has wavelength dependence, and the viewing angle can be ideally settled in consideration of the wavelength dependence. Since the absolute values of the respective refractive index anisotropies of the elements that constitute the half-transmissive liquid crystal display element according to the present embodiment have substantially the same wavelength dependence, however, only a typical wavelength may be taken into consideration. For simplicity, the refractive index anisotropy and retardation for a wavelength of 550 nm will be described below.

According to the present embodiment, the respective materials and thicknesses of the individual layers are designed so that we have $\Delta nch \cdot dch = -600$ nm, $\Delta ndc \cdot ddc = +500$ nm, $\Delta nlc \cdot dlc = +500$ nm, $\Delta nph \cdot dph = -137$ nm, $\Delta npol \cdot dpol = -275$ nm.

Adding up these values, we obtain $Plcd = -12$ nm.

In order to examine the influences of changes in color and brightness, which depend on the viewing angles of the half-transmissive liquid crystal display element and the reflective liquid crystal display element, upon the visibility of display, a subjective evaluation test was conducted. A plurality of liquid crystal display elements that have different values for Rlcd were prepared for this test. In this test, fifty trialists were asked to give marks for visibility with varied viewing angles to the individual display elements on a five-grade basis.

Figure 6:
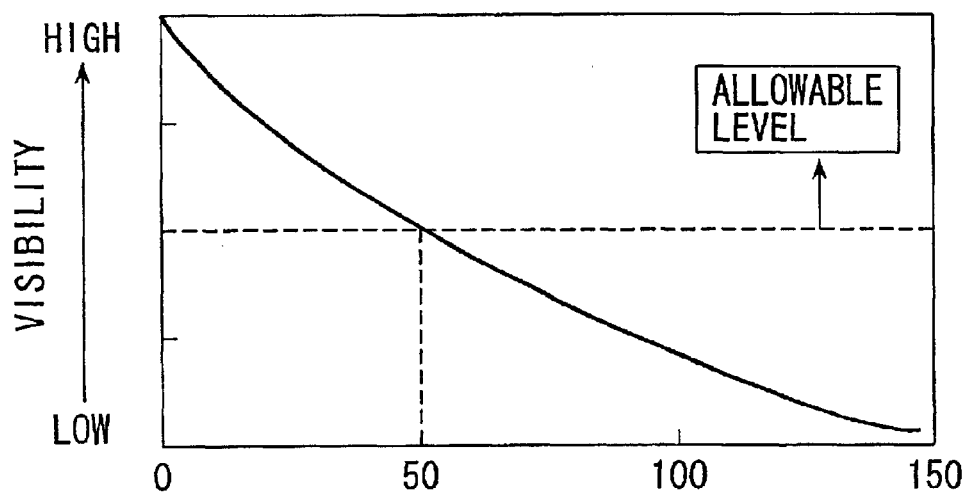
FIG. 6 is a diagram showing the result of subjective evaluation of the relation between retardation and visibility.

FIG. 6 shows the average mark for visibility compared with Rlcd. The smaller the absolute value of Rlcd, as seen from FIG. 6, the more conspicuous the liquid crystal display elements are. It can be concluded, however, that the allowable level is attained if Rlcd is not greater than 50 nm.

According to the present embodiment, |Rlcd|=12 nm is given, so that the allowable level is fully reached. Thus, the display characteristic is changed less by the change of the viewing angle, so that a very conspicuous liquid crystal display element can be obtained.

The present invention is not limited to the embodiment described above, and various changes and modifications may be effected therein by one skilled in the art without departing from the scope or spirit of the invention. For example, the respective refractive index anisotropies and thicknesses of the individual layers are not limited to the values according to the foregoing embodiment. The values for the layers may be changed only if the absolute value of Rlcd for the liquid crystal display element as a whole is not greater than 50 nm.

According to the embodiment described herein, the liquid crystal display element is of the half-transmissive type. However, the same effect of the present invention can be displayed if the liquid crystal display element of a reflective type such that the phase difference plate 2, polarization plate 3, and backlight unit 14 are removed and that the total reflectance of the circularly polarized light components in the specific direction, reflected by the first and second selectively reflective layers 4 and 6, is 100% or nearly 100%.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflective or half transmissive liquid crystal display element comprising:

a flat transparent substrate;

a second transparent substrate;

a first polarization plate having a first average refractive index for a direction perpendicular to a display plane and a second average refractive index in a direction parallel to the display plane;

a first phase difference plate having a first average refractive index for a direction perpendicular to the display plane and a second average refractive index for a direction parallel to the display plane, the first polarization plate and the first phase difference plate being arranged successively on an outer surface of the first transparent substrate;

a second polarization plate having a first average refractive index for a direction perpendicular to a display plane and a second average refractive index in a direction parallel to the display plane;

a second chase difference plate having a first average refractive index for a direction perpendicular to the display plane and a second average refractive index for a direction parallel to the display plane, the second polarization plate and the second phase difference plate being arranged successively on an outer surface of the second transparent substrate;

a liquid crystal layer disposed between the first and second transparent substrates and having a first average refractive index for a direction perpendicular to the display plane and a second average refractive index for a direction parallel to the display plane; and a selectively reflective layer for reflecting part or whole of circularly polarized light in a specific direction, the selectively reflective layer having a first average refractive index for a direction perpendicular to the display plane and a second average refractive index for a direction parallel to the display plane, the first selectively reflective layer being disposed between the first and second transparent substrates;

the first and second polarization plates, first and second phase difference plates, liquid crystal layer, and selectively reflective layer being formed so that the absolute value of the sum total of the product of the thickness and the difference between the first and second average refractive indexes of the polarization plate, the product of the thickness and the difference between the first and second average refractive indexes of the phase difference plate, the product of the thickness and the difference between the first and second average refractive indexes of the liquid crystal layer, and the product of the thickness and the difference between the first and second average refractive indexes of the selectively reflective layer is 50 nm or less.

2. A reflective or half transmissive liquid crystal display element according to claim 1, wherein said selectively reflective layer is formed of one or a plurality of layers of a cholesteric liquid crystal, and one or more layers having positive refractive index anisotropy are arranged adjacent to the selectively reflective layer or with one or more organic layers being interposed therebetween.

3. A reflective or half transmissive liquid crystal display element according to claim 2, wherein at least one of said layers having positive refractive index anisotropy is formed of a discotic liquid crystal.

4. A reflective or half transmissive liquid crystal display element according to claim 2, wherein at least one of said layers having positive refractive index anisotropy includes a reflective layer for reflecting specifically polarized light, light in a specific wavelength zone, or specifically polarized light in a specific wavelength zone only, out of incident light.

5. A reflective or half transmissive liquid crystal display element comprising:

a polarization plate having a first average refractive index for a direction perpendicular to a display plane and a second average refractive index in a direction parallel to the display plane;

phase difference plate having a first average refractive index for a direction perpendicular to the display plane and a second average refractive index for a direction parallel to the display plane;

a liquid crystal layer having a first average refractive index for a direction perpendicular to the display plane and a second average refractive index for a direction parallel to the display plane;

a first selectively reflective layer baying negative refractive index anisotropy, for reflecting part or whole of circularly polarized light in a specific direction, the selectively reflective layer having a first average refractive index for a direction perpendicular to the display plane and a second average refractive index for a direction parallel to the display plane;

a second selectively reflective layer having positive refractive index anisotropy, for reflecting part or whole of circularly polarized light in a specific direction, the selectively reflective layer having a first average refractive index for a direction perpendicular to the display plane and a second average refractive index for a direction parallel to the display plane;

the polarization plate, phase difference plate, liquid crystal layer, and selectively reflective layer being formed so that the absolute value of the sum total of the product of the thickness and the difference between the first and second average refractive indexes of the polarization plate, the product of the thickness and the difference between the first and second average refractive indexes of the phase difference plate, the product of the thickness and the difference between the first and second average refractive indexes of the liquid crystal layer, and the product of the thickness and the difference between the first and second average refractive indexes of the first and second selectively reflective layers is 50 nm or less.

6. A reflective or half transmissive liquid crystal display element comprising:

a first transparent substrate;

a second transparent substrate;

a first polarization plate having a first average refractive index for a direction perpendicular to a display plane and a second average refractive index in a direction parallel to the display plane;

a first phase difference plate having a first average refractive index for a direction perpendicular to the display plane and a second average refractive index for a direction parallel to the display plane, the first polarization plate and first phase difference plate being arranged successively on an outer surface of the first transparent substrate;

a second polarization plate having a first average refractive index for a direction perpendicular to a display plane and a second average refractive index in a direction parallel to the display plane;

a second phase difference plate having a first average refractive index for a direction perpendicular to the display plane and a second average refractive index for a direction parallel to the display plane, the second polarization plate and second phase difference plate being arranged successively on an outer surface of the second transparent substrate;

a liquid crystal layer disposed between the first and second transparent substrates and having a first average refractive index for a direction perpendicular to the display plane and a second average refractive index for a direction parallel to the display plane; and a first selectively reflective layer for reflecting part or whole of circularly polarized light in a specific direction, the first selectively reflective layer having a first average refractive index for a direction perpendicular to the display plane and a second average refractive index for a direction parallel to the display plane;

a second selectively reflective layer for reflecting part or whole of circularly polarized light in a specific direction, the second selectively reflective layer having a first average refractive index for a direction perpendicular to the display plane and a second average refractive index for a direction parallel to the display plane, the first and second selectively reflective layers being disposed between the first and second transparent substrates;

the first and second polarization plates, first and second phase difference plates, liquid crystal layer, and first and second selectively reflective layers being fanned so that the absolute value of the sum total of the product of the thickness and the difference between the first and second average refractive indexes of the polarization plates, the product of the thickness and the difference between the first and second average refractive indexes of the phase difference plates, the product of the thickness and the difference between the first and second average refractive indexes of the liquid crystal layer, and the product of the thickness and the difference between the first and second average refractive indexes of the selectively reflective layers is 50 nm or less.

* * * * *